(12) United States Patent
Choi

(10) Patent No.: US 11,687,087 B2
(45) Date of Patent: Jun. 27, 2023

(54) SYSTEMS AND METHODS FOR SHARED CROSS-MODAL TRAJECTORY PREDICTION

(71) Applicant: Honda Motor Co., Ltd., Tokyo (JP)

(72) Inventor: Chiho Choi, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 298 days.

(21) Appl. No.: 16/989,066

(22) Filed: Aug. 10, 2020

(65) Prior Publication Data

US 2021/0286371 A1 Sep. 16, 2021

Related U.S. Application Data

(60) Provisional application No. 62/988,791, filed on Mar. 12, 2020.

(51) Int. Cl.
*G05D 1/02* (2020.01)
*G01S 17/89* (2020.01)
(Continued)

(52) U.S. Cl.
CPC ............ *G05D 1/0253* (2013.01); *G01S 17/89* (2013.01); *G05D 1/0088* (2013.01);
(Continued)

(58) Field of Classification Search
CPC .. G05D 1/0253; G05D 1/0088; G05D 1/0219; G05D 1/0221; G05D 1/0248;
(Continued)

(56) References Cited

U.S. PATENT DOCUMENTS 11,200,429 B1 * 12/2021 Evans ..................... G01S 17/89
2019/0147250 A1 * 5/2019 Zhang .................... G06V 20/41
382/224
2020/0159225 A1 * 5/2020 Zeng ................... G01C 21/3453

OTHER PUBLICATIONS

Yuning Chai, Benjamin Sapp, Mayank Bansal, Dragomir Anguelov, "MultiPath: Multiple Probabilistic Anchor Trajectory Hypotheses for Behavior Prediction" Oct. 12, 2019, Waymo LLC, 3rd Conference on Robot Learning (CoRL 2019) (Year: 2019).*

(Continued)

*Primary Examiner* — Aniss Chad
*Assistant Examiner* — Christine Nguyen Huynh
(74) *Attorney, Agent, or Firm* — Rankin, Hill & Clark LLP

(57) ABSTRACT

Systems and methods for trajectory prediction and motion device control include receiving a first set of data about a surrounding environment of a motion device. The first set of data includes first sensory data and first position data. The method includes receiving a second set of data about the surrounding environment of the motion device. The second set of data includes second sensory data and second position data, where the first sensory data differs in modality from the second sensory data. The method also includes extracting features from the first set of data that model motion behavior of the motion device, and extracting features from the second set of data that model motion behavior of the motion device. The method includes inputting the features into a machine learning model, and computing a first trajectory based on a first latent variable and a second trajectory based on a second latent variable.

7 Claims, 4 Drawing Sheets

(51) Int. Cl.
G05D 1/00 (2006.01)
G06N 20/00 (2019.01)
(52) U.S. Cl.
CPC ......... *G05D 1/0219* (2013.01); *G05D 1/0221* (2013.01); *G05D 1/0248* (2013.01); *G06N 20/00* (2019.01); *G05D 2201/0213* (2013.01)
(58) Field of Classification Search
CPC . G05D 2201/0213; G01S 17/89; G01S 17/86; G01S 17/931; G01S 7/4808; G06N 20/00; G06N 3/0454; G06N 3/0472; G06N 3/088; G01C 21/3407; G01C 21/3602
See application file for complete search history.

(56) References Cited

OTHER PUBLICATIONS

N. Lee, W. Choi, P. Vernaza, C. B. Choy, P. H. S. Torr and M. Chandraker, "DESIRE: Distant Future Prediction in Dynamic Scenes with Interacting Agents," 2017 IEEE Conference on Computer Vision and Pattern Recognition (CVPR), 2017, pp. 2165-2174, doi: 10.1109/CVPR.2017.233. (Year: 2017).*
Zhao, H., Shi, J., Qi, X., Wang, X., Jia, J.: Pyramid scene parsing network. In: IEEE Conf. on Computer Vision and Pattern Recognition (CVPR). (2017) 2881-2890.
Zhao, T., Xu, Y., Monfort, M., Choi, W., Baker, C., Zhao, Y., Wang, Y., Wu, Y .N.: Multi-agent tensor fusion for contextual trajectory prediction. In: Proceedings of the IEEE Conference on Computer Vision and JPattern Recognition. (2019) 12126-12134.
Alahi, A., Goel, K., Ramanathan, V., Robicquet, A., Fei-Fei, L., Savarese, S.: Social lstm: Human trajectory prediction in crowded spaces. In: Proceed ings of the IEEE Conference on Computer Vision and Pattern Recognition. (2016) 961-971.
Aytar, Y., Castrejon, L., Vondrick, C., Pirsiavash, H., Torralba, A.: Cross-modal scene networks. IEEE transactions on pattern analysis and machine intelligence 40(10) (2017) 2303-2314.
Bertinetto, L., Valmadre, J., Henriques, J.F., Vedaldi, A., Torr, P.H.: Fully-convolutional siamese networks for object tracking. In: European conference on computer vision, Springer (2016) 850-865.
Bhattacharyya, A., Ftitz, M., Schiele, B.: Long-term on-board prediction of people in traffic scenes under uncertainty. In: Proceedings of the IEEE Conference on Computer Vision and Pattern Recognition. (2018) 4194-4202.
Chai, Y., Sapp, B., Bansal, M., Anguelov, D.: Multipath: Multiple probabilistic anchor trajectory hypotheses for behavior prediction. arXiv preprint arXiv:I910.05449 (2019).
Chen, L.C., Papandreou, G., Kokkinos, I., Murphy, K., Yuille, A.L.: Deeplab: Semantic image segmentation with deep convolutional nets, atrous convolution, and fully connected crfs. IEEE transactions on pattern analysis and machine intelligence 40(4) (2018) 834-848.
Choi, C., Dariush, B.: Looking to relations to future trajectory forecast. In: Computer Vision (ICCV), 2019 IEEE International Conference on, IEEE (2019).
Choi, C., Kim, S., Ramani, K.: Learning hand articulations by hallucinating heat distribution. In: Proceedings of the IEEE International Conference on Computer Vision (2017) 3104-3113.
Choi, C., Patil, A., Malla, S.: Drogon: A causal reasoning framework for future trajectory forecast. arXiv preprint arXiv:1908.00024 (2019).
Cordts, M., Omran, M., Ramos, S., Rehfeld, T., Enzweiler, M., Benenson , R., Franke, U., Roth, S., Schiele, B.: The cityscapes dataset for semantic urban scene understanding. In: Proceedings of the IEEE conference on computer vision and pattern recognition. (2016) 3213-3223.
Dai, J., Qi, H., Xiong, Y., Li, Y., Zhang, G., Hu, H., Wei, Y.: Deformable convolutional networks. In: Proceedings of the IEEE International Conference on Computer Vision (2017) 764-773.
Deo, N., Trivedi, M.M.: Multi-modal trajectory prediction of surrounding vehicles with maneuver based lstms. In: 2018 IEEE Intelligent Vehicles Symposium (IV), IEEE (2018) 1179-1184.
Geiger, A. Lenz. P., Stiller. C., Urtasun. R.: Vision meets robotics: The kitti dataset. The International Journal of Robotics Research 32(11) (2013) 1231 -1237.
Gupta, A., Johnson, J., Fei-Fei, L., Savarese, S., Alahi, A.: Social gan: Socially acceptable trajectories with generative adversarial networks. In: IEEE Conference on Computer Vision and Pattern Recognition (CVPR). (2018).
Gupta, S., Hoffman, J., Malik, J.: Cross modal distillation for supervision transfer. In: Proceedings of the IEEE conference on computer vision and pattern recognition. (2016) 2827-2836.
Hasan, I., Setti, F., Tsesmelis, T., Del Bue, A., Galasso, F., Cristani, M.: Mx-lstm: Mixing tracklets and vislets to jointly forecast trajectories and head poses. In: The IEEE Conference on Computer Vision and Pattern Recognition (CVPR). (Jun. 2018).
He, K., Gkioxari, G., Dollar, P., Girshick, R.: Mask r-cnn. In: Computer Vision (ICCV), 2017 IEEE International Conference on, IEEE (2017) 2980-2988.
Huang, X., McGill, S., Williams, B.C., Fletcher, L., Rosman , G.: Uncertainty-aware driver trajectory prediction at urban intersections. 2019 IEEE International Conference on Robotics and Automation (ICRA) (2019).
Jain, A., Singh, A., Koppula, H.S., Soh, S., Saxena, A.: Recurrent neural networks for driver activity anticipation via sensory-fusion architecture. In: 2016 IEEE International Conference on Robotics and Automation (ICRA), IEEE (2016) 3118-3125.
Kim, C., Li, F., Ciptadi, A., Rehg, J.M.: Multiple hypothesis tracking revisited. In: Proceedings of the IEEE International Conference on Computer Vision. (2015) 4696-4704.
Kosaraju, V., Sadeghian , A., Martin-Martin, R., Reid, I., Rezatofighi, H., Savarese, S.: Social-bigat: Multimodal trajectory forecasting using bicycle-gan and graph attention networks. In: Advances in Neural Information Processing Systems. (2019) 137-146.
Lee, N., Choi, W., Vemaza, P., Choy, C.B., Torr, P.H., Chandraker, M.: Desire: Distant future prediction in dynamic scenes wilth interacting agents. In: Proceedings of the IEEE Conference on Computer Vision and Pattern Recognition. (2017) 336-345.
Li, J., Ma, H., Tomizuka, M.: Conditional generative neural system for probabilistic trajectory prediction. In: 2019 IEEE Conference on Robotics and Systems (IROS). (2019).
Li, J., Ma, H., Tomizuka, M.: Interaction-aware multi-agent tracking and probabilistic behavior prediction via adversarial learning. In: 2019 IEEE International Conference on Robotics and Automation (ICRA), IEEE (2019).
Lin, T.Y., Dollar, P., Girshick, R., He, K., Hariharan, B., Belongie, S.: Feature pyramid networks for object detection. In: CVPR. vol. 1. (2017).
Liu, S., Qi, L., Qin, H., Shi, J., Jia, J.: Path aggregation network for instance segmentation. In: Proceedings of the IEEE Conference on Computer Vision and Pattern Recognition. (2018) 8759-8768.
Ma, Y., Zhu, X., Zhang, S., Yang, R., Wang, W., Manocha, D.: Trafficpredict: Trajectory prediction for heterogeneous traffic-agents. (2019).
Malla; S.; Choi; C.: Nemo: Future object localization using noisy ego priors. arXiv preprint arXiv:1909.08150 (2019).
Ngiam, J., Khosla, A., Kim, M., Iam, J., Lee, H., Ng, A.Y.: Multimodal deep learning. In: Proceedings of the 28th International conference on machine learning (ICML-11). (2011) G89-G9G.
Park, S.H., Kim, B., Kang, C.M., Chung, C.C., Choi, J.W.: Sequence-to-sequence prediction of vehicle trajectory via lstm encoder-decoder architecture. In: 2018 IEEE Intelligent Vehicles Symposium (IV), IEEE (2018) 1672-1678.
Patil, A., Malla, S., Gang, H., Chen, Y.T.: The h3d dataset for full-surround 3d multi-object detection and tracking in crowded urban scenes. In:2019 International Conferen ce on Robotics and Automation (ICRA), IEEE (2019) 9552-9557.
Peng, Y., Huang, X., Qi, J.: Cross-media shared representation by hierarchical learning with multiple deep networks. In: IJCAI. (2016) 3846-3853.

(56) References Cited

OTHER PUBLICATIONS

Rhinehart, N., Kitani, K.M., Vernaza, P.: R2p2: A reparameterized pushforward policy for diverse, precise generative path forecasting. In: Proceedings of the European Conference on Computer Vision (ECCV). (2018) 772-788.

Rhinehart, N., McAllister, R., Kitani, K., Levine, S.: Precog: Prediction conditioned on goals in visual multi-agent settings. In: Proceedings of the IEEE International Conference on Computer Vision. (2019) 2821-2830.

Robicquet, A., Sadeghian, A., Alahi, A., Savarese, S.: Learning social etiquette: Human trajectory understanding in crowded scenes. In: European conference on computer vision, Springer (2016) 549 565.

Rudenko, A., Palmieri, L., Herman, M., Kitani, K.M., Gavrila, D.M., Arras, K.O.: Human motion trajectory prediction: A survey arXiv preprint arXiv:1905.06113 (2019).

Salzmann, T., Ivanovic, B., Chakravarty, P., Pavone, M.: Trajectron++: Multi-agent generative trajectory forecasting with heterogeneous data for control. arXiv preprint arXiv:2001.030936 (2020).

Schöller, C., Aravantinos, V., Lay, F., Knoll, A.: What the constant velocity model can teach us about pedestrian motion prediction . In: arXiv:1903.07933. (2019).

Su, S., Pyo Hong, J., Shi, J., Soo Park, H.: Predicting behaviors of basketball players from first person videos. In: Proceedings of the IEEE Conference on Computer Vision and Pattern Recognition. (2017) 1501-1510.

Su, S., Peng, C., Shi, J., Choi, C.: Potential field: Interpretable and unified representation for trajectory prediction. arXiv preprint arXiv:1911.07414 (2019).

Vemula, A., Muelling, K., Oh, J.: Social attention: Modeling attention in human crowds. In: 2018 IEEE International Conference on Robotics and Automation (ICRA), IEEE (2018).

Xu, Y., Piao, Z., Gao, S.: Encoding crowd interaction with deep neural network for pedestrian trajectory prediction. In Proceedings of the IEEE Conference on Computer Vision and Pattern Recognition. (2018) 5275-5284.

Xue, H., Huynh, D.Q., Reynolds, M.: Ss-lstm: A hierarchical lstm model for pedestrian trajectory prediction. In: 2018 IEEE Winter Conference on Applications of Computer Vision (WACV), IEEE (2018) 1186-1194.

Yagi, T., Mangalam, K, Yonetani, R., Sato, Y.: Future person localization in first-person videos. In: The IEEE Conference on Compu ter Vision and Pattern Recognition (CVPR) (Jun. 2018).

Yang, X., Molchanov, P., Kautz, J.: Multilayer and multimodal fusion of deep neural networks for video classification. In: Proceedings of the 24th ACM international conference on multimedia, ACM (2016) 978-987.

Yao, Y., Xu, M., Choi, C., Crandall, D.J., Atkins, E.M., Dariush, B.: Egocentric vision-based future vehicle localization for intelligent driving assistance systems. In: IEEE International Conference on Robotics and Automation (ICRA), IEEE (2019).

Yi, D., Lei, Z., Li, S.Z.: Shared representation learning for heterogenous face recognition. In: 2015 11th IEEE international conference and workshops on automatic face and gesture recognition (FG). vol. 1., IEEE (2015) 1-7.

Zach, C., Pock, T., Bischof, H.: A duality based approach for realtime tv-11optical flow. In: Joint pattern recognition symposium, Springer (2007) 214-223.

Zeng, W., Luo, W., Suo, S., Sadat, A., Yang, B., Casas, S., Urtasun, R.: End-to-end interpretable neural motion planner. In: Proceedings of the IEEE Conference on Computer Vision and Pattern Recognition. (2019) 8660-8669.

Zhang, P., Ouyang, W., Zhang, P., Xue, J., Zheng, N.: Sr-lstm: State refinement for lstm towards pedestrian trajectory prediction. In: Proceedings of the IEEE Conference on Computer Vision and Pattern Recognition. (2019) 12085-12094.

* cited by examiner

SYSTEMS AND METHODS FOR SHARED CROSS-MODAL TRAJECTORY PREDICTION

RELATED APPLICATIONS

This application claims priority to U.S. Prov. Application Ser. No. 62/988,791 filed on Mar. 17, 2020, which is expressly incorporated herein by reference.

BACKGROUND

Recent advances in scene understanding have enabled machines to acquire knowledge of the surrounding environment. This rapid progress particularly in object detection, tracking, and semantic segmentation made within the last few years may raise expectations about the emergence of particular semi-autonomous and autonomous machines. In order to successfully control these machines, motion planning models and/or trajectory planning models should consider the past behavior of interactive agents (i.e., other machines, objects, humans, pedestrians, cars, cyclists, etc.) and predict the future motion of the machine and the interactive agents.

Intensive research has been conducted on forecasting future motion of humans and machines. However, current existing approaches may not be suitable for general-purpose trajectory forecast in some situations because of the following reasons: (i) social interactions are validated from the nearby surroundings with an assumption of slow movement of interactive agent, which is not generally applicable to machines as they move faster; (ii) the interactive environment is hypothesized as an open space, resulting in no or minimal considerations of scene context, which is not a feasible assumption in scenes with structured layouts; (iii) the proposed solutions are restricted to certain scenarios and not generalizable to other settings; and (iv) interactions with other non-machines (e.g., objects, pedestrians) are overlooked, which is essential for the safe operation of automation systems.

BRIEF DESCRIPTION

According to one aspect, a computer-implemented method for trajectory prediction and motion device control includes receiving a first set of data about a surrounding environment of a motion device. The first set of data includes first sensory data and first position data from the motion device. The method also includes receiving a second set of data about the surrounding environment of the motion device. The second set of data includes second sensory data and second position data from the motion device, and the second sensory data is a different modality than the first sensory data. The method further includes extracting features from the first set of data that model motion behavior of the motion device, and extracting features from the second set of data that model motion behavior of the motion device. The method includes inputting the features from the first set of data and the features from the second set of data into a machine learning model with a shared embedded space. Furthermore, the method includes computing a first trajectory based on a first latent variable sampled from the shared embedded space, and a second trajectory based on a second latent variable sampled from the shared embedded space.

According to another aspect, a computer-implemented method for trajectory prediction and motion device control includes receiving a first set of data captured during a plurality of time steps about a surrounding environment of a motion device. The first set of data includes first sensory data having a first modality and first position data from the motion device. Further, the method includes receiving a second set of data captured during the plurality of time steps about the surrounding environment of the motion device. The second set of data includes second sensory data having a second modality and second position data from the motion device. The first modality and the second modality are different. The method also includes generating a first feature representation describing a motion behavior of the motion device with respect to the surrounding environment based on the first set of data, and generating a second feature representation describing the motion behavior of the motion device with respect to the surrounding environment based on the second set of data. The method includes inputting the first feature representation and the second feature representation into a machine learning model including a shared cross-modal latent space embedded with features extracted from different modalities. The method also includes determining a first trajectory based on the first feature representation and a first latent variable sampled from the shared cross-modal latent space, and determining a second trajectory based on the second feature representation and a second latent variable sampled from the shared cross-modal latent space. The method further includes generating a control instruction based on the first trajectory and the second trajectory.

According to a further aspect, a system for trajectory prediction and motion device control, includes one or more feature encoders, one or more trajectory decoders operatively connected for computer communication to a processor. The processor inputs a first sequence of images having a first modality and a first set of past positions into the one or more feature encoders to generate a first feature representation. The processor inputs a second sequence of images having a second modality and a second set of past positions into the one or more feature encoders to generate a second feature representation. The first modality and the second modality are different. The processor determines a first trajectory by inputting the first feature representation into the one or more trajectory decoders and sampling a shared latent space with a latent variable having the same modality as the first modality. The processor also determines a second trajectory by inputting the second feature representation into the one or more trajectory decoders and sampling the shared latent space with a latent variable having the same modality as the second modality. Furthermore, the processor generates a control instruction based on the first trajectory and the second trajectory.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
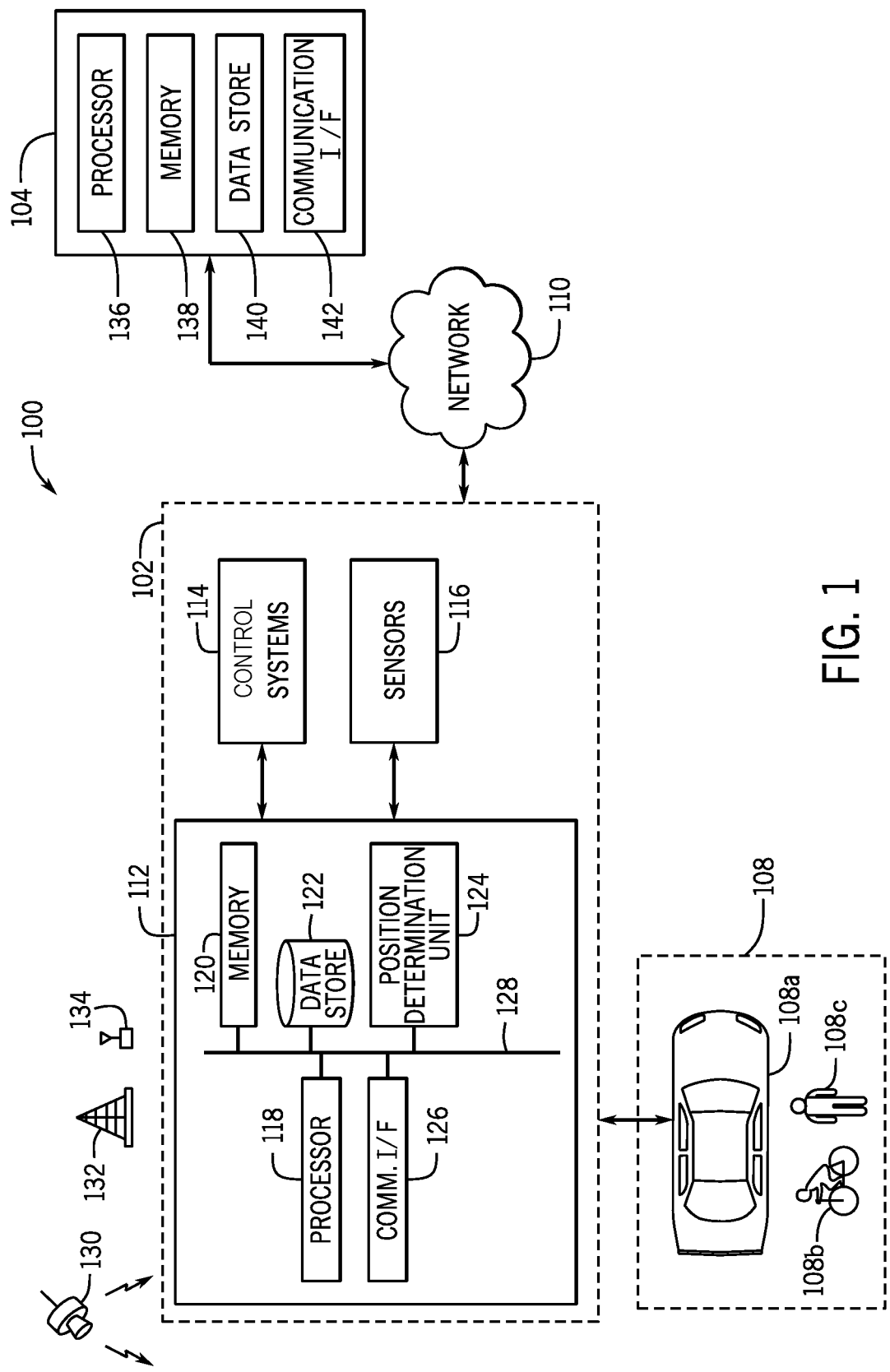
FIG. 1 is a block diagram of a system for trajectory prediction and motion device control according to an exemplary embodiment.

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth™, Zigbee™, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Disk," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles. Additionally, the term "vehicle" may refer to a motion device.

"Control system," as used herein may include, but is not limited to, any automatic or manual systems that may be used to enhance the motion device, driving of the motion device, and/or security of the motion device. In some embodiments, "control system" may include vehicle control systems. Exemplary control systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, an occupant detection system, a suspension system, a seat configuration system, a vehicle cabin lighting system, an audio system, a sensory system, an interior or exterior camera system among others.

According to aspects of the present disclosure, systems and methods for shared cross-modal trajectory prediction for motion device control are provided. It is understood that motion device can include any device capable of mechanically moving, including semi-autonomous and autonomous devices, such as: robotic systems, humanoids, vehicles (as defined above), planes, drones, boats, and mechanical systems, among others. Some illustrative embodiments described herein refer to the motion device as a vehicle. However, it is understood that any other type of motion device can be implemented and the vehicle is used as an illustrative example. Referring now to the drawings, wherein the showings are for purposes of illustrating one or more exemplary embodiments and not for purposes of limiting same, FIG. 1 is a block diagram of a system 100 for trajectory prediction and motion device control according to an exemplary embodiment. The system 100 includes a vehicle 102 (e.g., a motion device, a target agent), a remote server 104, and interactive agents 108. The interactive agents 108 include other users (e.g., interactive agents, objects, road users, other motion devices) in a surrounding environment of the vehicle 102. For example, the interactive agents 108 may include a remote vehicle 108a, a cyclist 108b, and a pedestrian 108c. The cyclist 108b and/or the pedestrian 108c may each be associated with portable devices (not shown). In one embodiment, the vehicle 102, the remote server 104, and the interactive agents 108 are each operatively connected for computer communication using, for example, a network 110. The cyclist 108b and/or the pedestrian 108c are capable of being operatively connected for computer communication via one or more portable devices (not shown).

The vehicle 102 will be discussed in detail herein, however, it is understood that the remote server 104 and/or the interactive agents 108 may include one or more of the components and/or functions discussed herein with respect to the vehicle 102. Thus, it is understood that although not shown in FIG. 1, one or more of the components of the vehicle 102, may also be implemented with and/or executed with the remote server 104 and/or the interactive agents 108, and/or other devices operable for computer communication with the system 100 and/or the vehicle 102. Further, it is understood that the components of the system 100 and the vehicle 102, as well as the components of other systems, hardware architectures, and software architectures discussed herein, may be combined, omitted, or organized into different architectures for various embodiments.

In FIG. 1, the vehicle 102 includes a computing device 112, control systems 114, and sensors 116. Generally, the computing device 112 includes a processor 118, a memory 120, a data store 122, a position determination unit 124, and a communication interface (I/F) 126, which are each operably connected for computer communication via a bus 128 and/or other wired and wireless technologies discussed herein. The computing device 112 may include provisions for processing, communicating and interacting with various components of the vehicle 102 and other components of the system 100, including the remote server 104 and the interactive agents 108.

The processor 118 may include logic circuitry with hardware, firmware, and software architecture frameworks for facilitating control of the vehicle 102 and trajectory predictions. Thus, in some embodiments, the processor 118 may store application frameworks, kernels, libraries, drivers, application program interfaces, among others, to execute and control hardware and functions discussed herein. For example, as will be discussed herein with FIG. 2, the processor 118 may include a framework 200 for machine learning and trajectory prediction including a machine learning model. In some embodiments, the memory 120 and/or the data store (e.g., disk) 122 may store similar components as the processor 118 for execution by the processor 118.

The position determination unit 124 may include hardware (e.g., sensors) and software to determine and/or acquire position data about the vehicle 102. For example, the position determination unit 124 may include a global positioning system (GPS) unit (not shown) and/or an inertial measurement unit (IMU) (not shown). Thus, the position determination unit 124 may provide a geoposition of the vehicle 102 based on satellite data from, for example, a global position unit 130, or from any Global Navigational Satellite infrastructure (GNSS), including GPS, Glonass (Russian) and/or Galileo (European). Further, the position determination unit 124 may provide dead-reckoning data or motion data from, for example, a gyroscope, accelerometer, magnetometers, among other sensors (not shown). In some embodiments, the position determination unit 124 may be a navigation system that provides navigation maps, map data, and navigation information to the vehicle 102.

The communication interface (I/F) 126 may include software and hardware to facilitate data input and output between the components of the computing device 112 and other components of the system 100. Specifically, the communication I/F 126 may include network interface controllers (not shown) and other hardware and software that manages and/or monitors connections and controls bi-directional data transfer between the communication I/F 126 and other components of the system 100 using, for example, the network 110. In particular, the communication I/F 126 may facilitate communication (e.g., exchange data and/or transmit messages) with the interactive agents 108, the remote server 104, and/or other devices, using any type of communication hardware and/or protocols discussed herein. For example, the computer communication may be implemented using a wireless network antenna 132 (e.g., cellular, mobile, satellite, or other wireless technologies), a road side equipment 134 (e.g., Dedicated Short Range Communications or other wireless technologies), and/or the network 110.

Referring again to the vehicle 102, the control systems 114 may include any type of control system and/or system described herein to enhance the vehicle 102 and/or driving of the vehicle 102. For example, the control systems 114 may include autonomous driving systems, driver-assist systems, adaptive cruise control systems, lane departure warning systems, merge assist systems, freeway merging, exiting, and lane-change systems, collision warning systems, integrated vehicle-based safety systems, and automatic guided control systems, or any other advanced driving assistance systems (ADAS).

The sensors 116, which may be implemented in whole and/or in part with the control systems 114, may include various types of sensors for use with the vehicle 102 and/or the control systems 114 for detecting and/or sensing a parameter of the vehicle 102, the control systems 114, and/or an environment surrounding the vehicle 102. For example, the sensors 116 may provide data about interactive agents 108 in proximity (e.g., in an environment surrounding the vehicle 102) to the vehicle 102. In one embodiment, the sensors 116 may include visions sensors (e.g., imaging devices, cameras) and/or ranging sensors (e.g., RADAR, LiDAR). Accordingly, in one example, the sensors 116 are imaging sensors for capturing image data (e.g., a sequence of images) of the environment surrounding the vehicle 102, including one or more of the interactive agents 108. In another example, the sensors 116 include LiDAR sensors for capturing 3D point cloud data of the environment surrounding the vehicle 102, including one or more of the interactive agents 108.

It is understood that the sensors 116 may be disposed in one or more portions of the vehicle 102. For example, although not shown in FIG. 1, the sensors 116 could be integrated into a dashboard, seat, seat belt, door, bumper, front, rear, corners, dashboard, steering wheel, center console, roof or any other portion of the vehicle 102. In one embodiment described herein, the sensors 116 include p forward-looking imaging sensor mounted on the front and/or the roof of the vehicle 102. It is also understood that the sensors 116 may be any type of sensor.

Referring again to the system 100, the remote server 104 may perform one or more of the components and/or functions described herein with the computing device 112. In FIG. 1, the remote server 104 includes a processor 136, a memory 138, a data sore 140, and a communication interface (I/F) 142. In one embodiment, the remote server 104 may receive sensor data from the vehicle 102 and process the sensor data according to the framework 200 that will now will be described in detail with FIG. 2.

Figure 2:
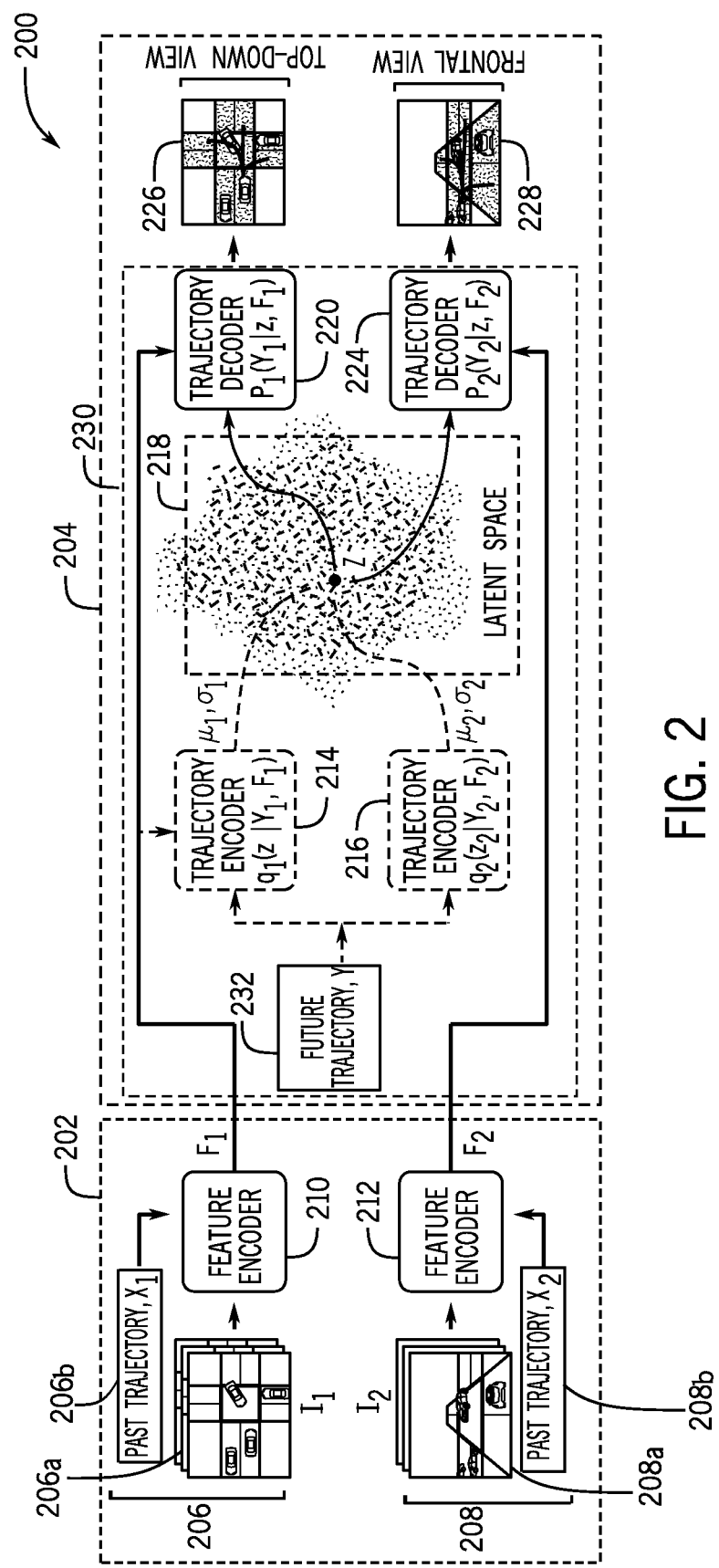
FIG. 2 is a schematic diagram of a deep learning framework for trajectory prediction and motion device control according to an exemplary embodiment.

The framework 200 in FIG. 2 illustrates an overview of a deep learning framework for predicting future trajectories of interactive agents in highly interactive environments. In FIG. 2, the framework 200 includes two stages: a feature encoding stage 202 and a cross-modal embedding stage 204. The feature encoding stage 202 determines motion behaviors of the vehicle 102 with respect to other directly observable influences and indirectly observable influences. A first data input 206 and a second data input 208 are fed into the framework 200. The motion behaviors (e.g., features) are extracted from a first set of sensory data 206a and a first past trajectory (i.e., first position data 206b) at a first feature encoder 210, and extracted from a second set of sensory data 208a and a second past trajectory (i.e., the first sensory data 208b) at a second encoder 212. The first set of sensory data 206a and the second set of sensory data 208a have different modalities. The feature encoding stage 202 will be described in more detail herein with FIG. 3 and an encoder 300. The cross-modal encoding part 202 includes a machine learning model 230 for training and prediction. A first trajectory encoder 214 and a second trajectory encoder 216 are for training within a latent space 218. A first trajectory decoder 220 and a second trajectory decoder 224 generate trajectory predictions. It is understood that although FIG. 2 shows two feature encoders and two trajectory encoders, the methods and systems described herein can include any number of encoders (e.g., one or more feature encoders, one or more trajectory encoders). Similarly, although FIG. 2 shows two decoders, the methods and systems described herein can include any number of trajectory decoders (e.g., one or more trajectory decoders). Exemplary methods utilizing the system 100, the framework 200, and the encoder 300 will now be described.

Figure 4:
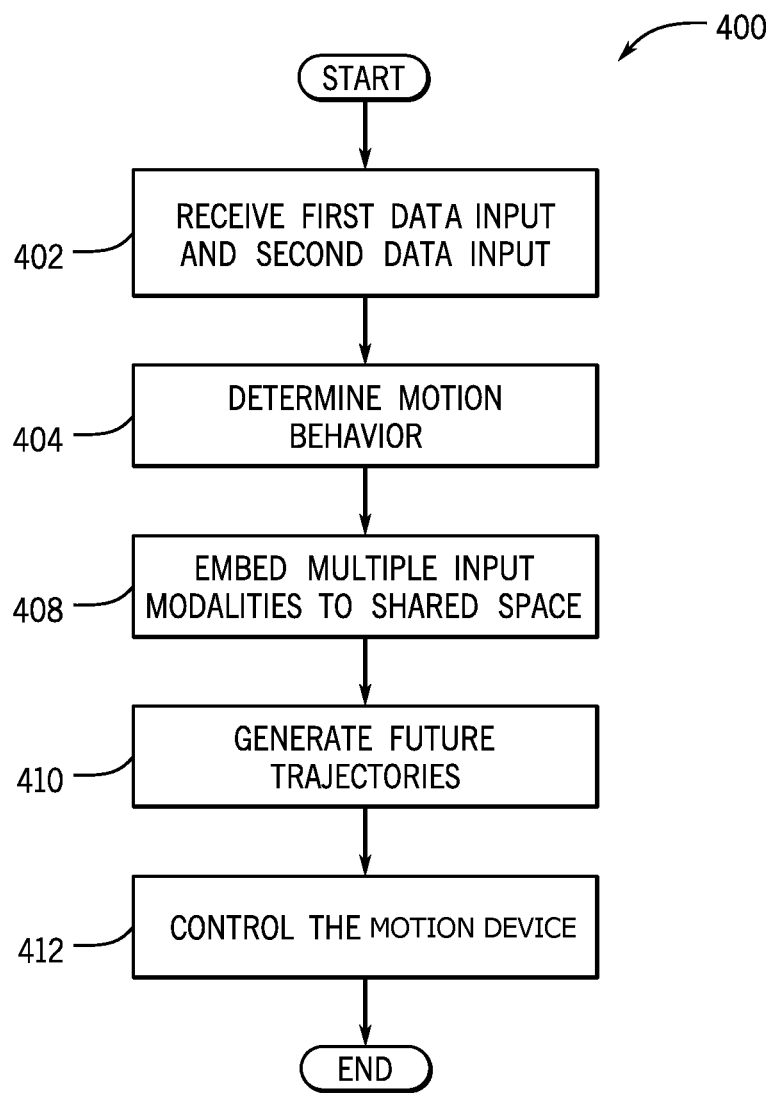
FIG. 4 is a process flow diagram of a method for trajectory prediction and motion device according to an exemplary embodiment.

FIG. 4 is a process flow diagram of a method 400 for trajectory prediction and motion device control according to one exemplary embodiment. As shown in FIG. 2, multiple sensory data is used as input to the framework 200. Thus, at block 402, the method 400 includes receiving the first data input 206 (e.g., a first set of data) and the second data input 208 (e.g., a second set of data) having different modalities. For example, the processor 118 receives the first set of data 206 about a surrounding environment of the vehicle 102. The first set of data 206 includes first sensory data 206a and first position data 206b from the vehicle 102. The first sensory data 206a and the first position data 206b are captured during a plurality of time steps. Thus, the first sensory data 206a and the first position data 206b are both past captured data sets. The first sensory data 206a and/or the first position data 206b may be captured by the control systems 114 and/or the sensors 116.

Figure 3:
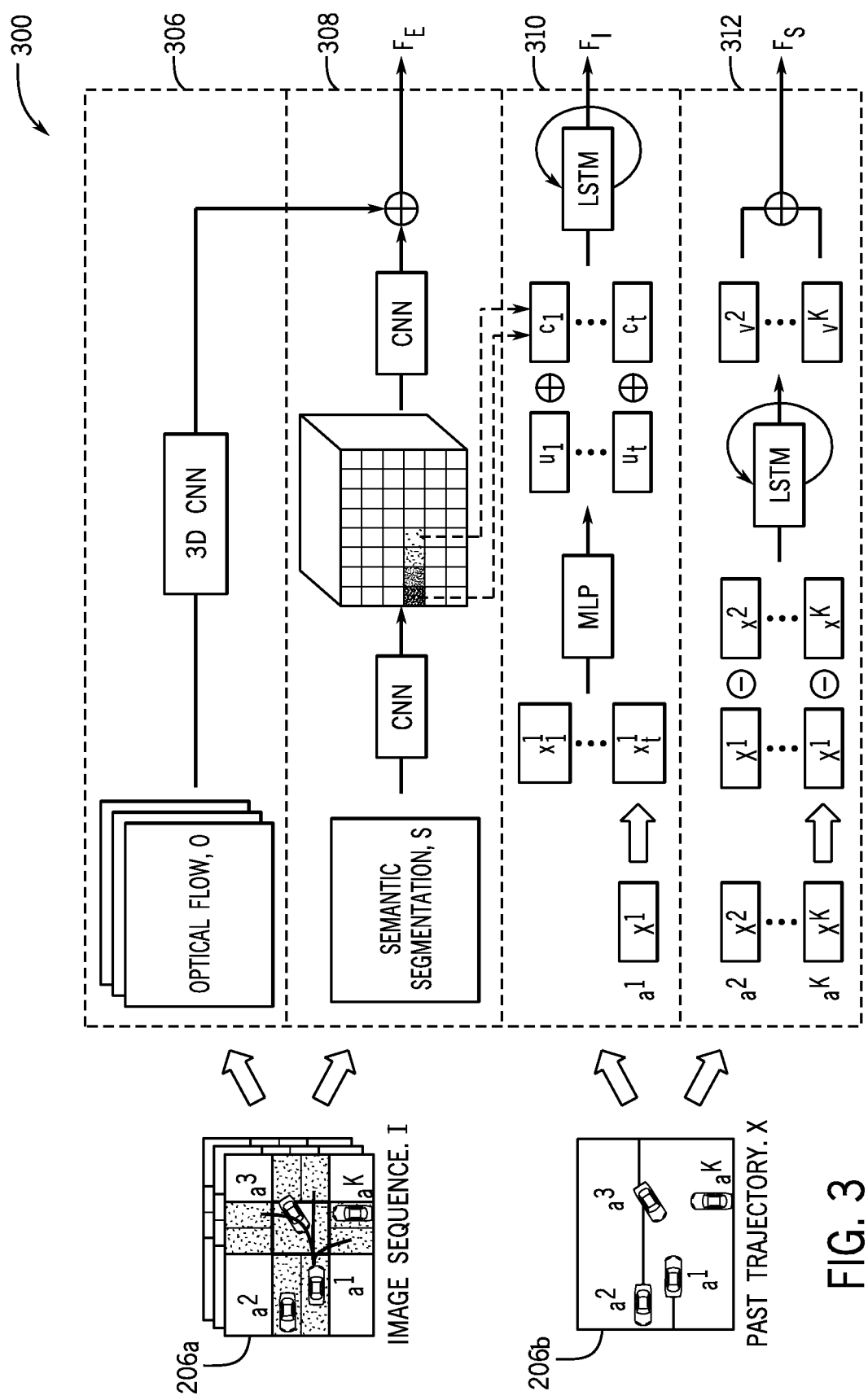
FIG. 3 is a schematic diagram showing the details of a feature encoder of FIG. 2 according to an exemplary embodiment.

In the embodiments shown in FIGS. 2 and 3, the first sensory data 206a includes a first sequence of images $I_1$ that is derived from LiDAR data providing 3D surveying of the surrounding environment of the vehicle 102. The LiDAR data may be captured using the sensors 116. Using the 3D point clouds of the LiDAR data, the processor 118 projects each single point in a top-down view. Thus, the first sensory data 206a is a past sequence of top-down views of the surrounding environment of the vehicle 102. The first position data 206b includes a sequence of past trajectories $X_1$ corresponding to the first sequence of images $I_1$. The first position data 206b may be received and/or captured by the position determination unit 124 and/or the sensors 116.

Block 402 also includes, receiving the second input 208 having a different modality than the first input. For example, the processor 118 receives a second set of data 208 about the surrounding environment of the vehicle 102. The second set of data 208 includes second sensory data 208a and second position data 208b from the vehicle 102. The second sensory data 208a and the second position data 208b are captured during a plurality of time steps. Thus, the second sensory data 208a and the first position data 208b are both past captured data sets. The second sensory data 208a and/or the second position data 208b may be captured by the control systems 114 and/or the sensors 116.

In the embodiments shown in FIGS. 2 and 3, the second sensory data 208a includes a second sequence of images $I_2$ derived from image data captured by the vehicle 102. For example, the second sensory data 208a may include image data (e.g., RGB images) from the sensors 116 (e.g., imaging sensors). In one embodiment, the sensors 116 include a front-camera for capturing frontal RGB images of the environment surrounding the vehicle 102. In this embodiment, the second sensory data 208a is a past sequence of frontal-views of the surrounding environment of the vehicle 102. The second position data 208b includes a sequence of past trajectories $X_2$ corresponding to the second sequence of images 12. The second position data 208b may be received and/or captured by the position determination unit 124 and/or the sensors 116.

As mentioned above, the first sensory data 206a and the second sensory data 208b are of different modalities. The modality is a particular form of sensory perception expressed in a particular way. In this embodiment, the first sensory data 206a has a first modality, namely, top-down view images derived from LiDAR data. The second sensory data 208b has a second modality, namely, frontal-view images derived from imaging data. It is understood that the input modalities used with the methods and systems described herein are not limited to these two types of modalities. The input modalities may include, but are not limited to, stereo images, depth images, RADAR, GPS, and other types of data that may provide visual and/or locational information about the surrounding environment of the vehicle 102.

The processor 118 inputs the first sequence of images (i.e., the first sensory data 206b) having the first modality and the first set of past positions (i.e., the first position data 206b) into the first feature encoder 210 to generate a first set of features and/or a first feature representation $F_1$. Similarly, the processor 118 inputs the second sequence of images (i.e., the second sensory data 208a) having the second modality and the second set of past positions 208b into the second feature encoder 212, to generate a second set of features and/or a second feature representation $F_2$. Similarly, the processor 118 inputs the second sequence of images As mentioned herein, the framework 200 may include one or more feature encoders and one or more trajectory decoders. For example, in one embodiment, the first sequence of images and the first set of past positions are inputs into one or more feature encoders. In other embodiments, the second sequence of images and the second set of past positions are inputs into one or more feature encoders. In one embodiment, where there are more than two feature encoders and more than two trajectory decoders, the sensory data can include camera data, LiDAR data, and RADAR data as different modalities. It is understood that other types of input modalities can be implemented.

The encoding process will now be described in more detail with block 404 of the method 400, which includes determining motion behaviors (e.g., features) of the vehicle 102 and/or the interactive agents 108 in the surrounding environment of the vehicle 102. The motion behaviors are determined with respect to directly observable influences and indirectly observable influences. For example, the processor 118 using the first feature encoder 210 extracts features from the first set of data 206 (i.e., the first sensory data 206a, the first position data 206b) that model motion behavior of the vehicle 102. Similarly, the processor 118 using the second encoder 212 extracts features that model motion behavior of the vehicle 102 from the second set of data 208 (i.e., the second set of sensory data 208a, and the second set of position data 208b).

As mentioned above, motion behavior of the vehicle 102 is determined with respect to motion intent of the vehicle 102 and directly observable influences and indirectly observable influences. In the embodiments discussed herein, stimuli are used to categorize such influences into three types: inertial stimuli, environmental stimuli, and social stimuli. Inertial stimuli describe motion intent of the vehicle 102 by observing a sequence of its past state, for example, first position data 206b and/or second position data 208b. Thus, the motion history of the vehicle 102 is modeled by implicitly considering its local perceptions. Environmental stimuli include contextual attributes of the surroundings such as road topology, road geometry, and semantic information. Both spatial attributes and temporal attributes of the surrounding environment of the vehicle 102 from past image sequences (e.g., the first sensory data 206a, the second sensory data 208a) are encoded. Social stimuli considers relational interactions between the vehicle 102 and all other road users (e.g., the interactive agents 108). Pair-wise relations are used to model social behavior from the interactive agents 108.

In the embodiments discussed herein, the features from the first set of data 206 and the features from the second set of data 208 are each composed the inertial stimuli, environmental stimuli, and social stimuli. Referring now to FIG. 3, the encoding process will be discussed in more detail. FIG. 3 illustrates an encoder 300, which is a detailed example of the first feature encoder 210 of FIG. 2. In FIG. 3, the encoder 300 is processing the first sensory data 206a and the first position data 206b. However, it is understood that the second feature encoder 212 may include one or more of the same or similar components of the encoder 300. It is also understood, that the second sensory data 208a and the second position data 208b may be processed by the second encoder 212 in a same or similar manner as the first sensory data 206a and the first position data 206b with the encoder 300. Additionally, in FIG. 3, the vehicle 102 is represented by and referred to as a target agent $a^k$, and the other interactive agents 108 are represented by and referred to as agent $a^1$, agent $a^2$, and agent $a^3$. Accordingly, given a sequence of images (i.e., the first sensory data 206a) and past positions (i.e., the first position data 206b), the feature encoder 300 analyzes internal, external, and social stimuli with respect to the target agent $a^k$ in the surrounding environment of the target agent $a^k$.

The encoder 300 includes four schematic layers: a temporal environmental layer 306, a spatial environmental layer 308, an inertial layer 310, and a social layer 312. The encoder 300 receives as input the first sensory data 206a and the first position data 206b and processes said data to generate feature representations $F_E$ (i.e., a feature representation comprised of environmental stimuli), $F_I$ (i.e., a feature representation comprised of inertial stimuli), and $F_S$ (i.e., a feature representation comprised of social stimuli). Each layer of the encoder 300 will now be described in more detail.

As mentioned above, environmental stimuli includes contextual cues of the surrounding environment of the target agent $a^k$. The encoder 300 encodes temporal attributes of the surrounding environment of the target agent $a^k$ based on the first sensory data 206a at the temporal environmental layer 306, and encodes spatial attributes of the surrounding environment of the target agent $a^k$ based on the first sensory data 206a at the spatial environment layer 308. Thus, in FIG. 3, a two-stream network is utilized with temporal and spatial attributes. To model such environmental stimuli, the encoder 300 recognizes the state and/or dynamic state of the target agent $a^k$ and the interactive agents (i.e., agent $a^1$, agent $a^2$, and agent $a^3$) as well as the semantic context of the driving scene.

The image sequence I (i.e., the first sensory data 206a) captured during the past time steps is used to generate two types of representations: a set of optical flow images O, as shown in the temporal environmental layer 306, and a segmentation map S, as shown in the spatial environmental layer 308. The optical flow is computed with a TV-L1 optical algorithm containing the pattern of motion of the target agent $a^k$ The temporal changes are processed using the 3D convolutional neural network $CNN_{3D}(\bullet)$ by extracting temporal feature representations $F_T$ along a time axis. This is expressed mathematically as:

$$F_T = CNN_{3D}(O; W_T) \quad (1)$$

where $W_T$ is a learned weight parameter.

In addition, a pixel-level segmentation map as shown in the spatial environmental layer 308 is obtained for each image I at a first time step. In one embodiment, the Deep-Lab-V2 model trained on the Cityscapes dataset is used to process the segmentation. In one embodiment, only background structures (e.g., road, sidewalk, vegetation) are left in the images to extract visual features $F_V$ from the stationary environment. The 2D convolutional network $CNN_{2D}(\bullet)$ is used at the spatial environmental layer 308 to take advantage of its spatial feature encoding. This is expressed mathematically as:

$$F_V = CNN_{2D}(S; W_V) \quad (2)$$

where $W_V$ is a learned weight parameter. The encoder 300 merges the temporal states $F_T$ of static and/or dynamic objects and the spatial features $F_V$ of the stationary context to generate spatial-temporal features $F_E$ given as follows:

$$F_E = F_T \oplus F_V \quad (3)$$

where $\oplus$ is an element-wise addition operator.

As discussed above, inertial stimuli includes attributes describing motion intent of the target agent $a^k$. The target agent $a^k$ and the interactive agents (i.e., agent $a^1$, agent $a^2$, and agent $a^3$) each have their own intent to make a certain motion behavior based on past states. As shown in the inertial layer 310, given the observation time horizon and a target agent index k, the encoder 300 encodes the past locations $X_k$ of the target agent $a^k$ into high dimensional feature representations $u_k$ through multi-layer perception (MLP). The encoded features are then combined with the local perception that contains mid-level semantic context $C_{X_t}$ (i.e., nearby areas of $X_t$ at time t). By adding spatial locality, interactions of the target agent $a^k$ toward the local environments further constrain the motion intent of the target agent $a^k$. The LSTM captures the temporal dependency of the motion states on the local environments and may be expressed mathematically as:

$$u_t^k <= MLP_I(X_t^k; W_E),$$

$$h_{I,t+1} = LSTM_I((u_t^k \oplus C_{X_t}), h_{I,t+1}; W_I) \quad (4)$$

where $W_E$ and $W_I$ are learned weight parameters of MLP and LSTM, and $h_{I,t+1}$ denotes the hidden state of the LSTM encoder at time t. The last hidden state of LSTM is defined as feature representation $F_I$.

As discussed above, social stimuli includes interactions between the target agent $a^k$ and other interactive agents (i.e., agent $a^1$, agent $a^2$, and agent $a^3$) in the surrounding environment. The social behavior between agents is modeled with pair-wise relations. As shown in the social layer 312, the relative motions of all road agents with respect to the motion of the target agent $a^k$ for the past time steps is computed. Each agent's relative motion is processed through LSTM thereby encoding the relational behavior between the target agent $a^k$ and every other agent. This may be expressed mathematically as:

$$V^i = X^k \ominus X^i \forall i \in \{1, \ldots, K\} \backslash \{k\},$$

$$h_{S,t+1} = LSTM_S(V_t^i h_{S,t}; W_S) \quad (5)$$

where $W_S$ is a learned weight parameters LSTM, and $h_{S,t}$ denotes the hidden state of the LSTM encoder at time t, and $\ominus$ is an element-wise subtraction operator. This process is simple yet effective to infer temporal changes of interactive behavior between every pair of agents. The last hidden state of each agent $i \in \{1, \ldots, K\} \backslash \{k\}$ is used as $F_S^i$. The resulting feature representations $F_S^i$ of each agent are then combined as social features $F_S$, which may be expressed mathematically as:

$$F_S = \Sigma_i F_S^i \forall i \in \{1, \ldots, K\} \backslash \{k\} \quad (6)$$

Additionally, the encoder 210 aggregates the environmental feature representations $F_E \in \mathbb{R}^{d \times d \times c}$ with the social feature representations $F_S \in \mathbb{R}^{1 \times 1 \times c}$, where d denotes the width/height of the feature and c is its depth. To do this, the encoder 300 generates an empty tensor $F_X \in \mathbb{R}^{d \times d \times c}$ that has the same shape as $F_E$ and fills the elements using $F_S$ based on the location $X_{t_0}^k$ of the target agent $a^k$ at time $t_0$. The generated representation features contain the spatial-temporal influences of all external factors toward the target agent $a^k$, which explicitly constrains its future motion on interactions. Further, pair-wise relations are constructed between entities $F_X$ by conditioning on the inertial feature representations $F_I$, which may be expressed mathematically as:

$$F = \Sigma_{ij} MLP_A(F_{X,i}, F_{X,j}, F_I; W_A) \quad (7)$$

where $i, j \in \{1, \ldots, d\}$ and A is are learnable weight parameters. Based on the descriptions above and with reference to FIG. 2, the first feature encoder 210 generates a first feature representation describing a motion behavior of the vehicle 102 with respect to the surrounding environment based on the first set of data 206. Similarly, the second feature encoder 212 generates a second feature representation describing the motion behavior of the vehicle 102 with respect to the surrounding environment based on the second set of data 208. As defined above with FIG. 3, the first feature representation and the second feature representation are each composed of environmental stimuli, inertial stimuli, and social stimuli. Thus, the first feature representation and the second feature representation are each composed of a plurality of stimuli.

Referring again to FIG. 4, at block 408 the method 400 includes embedding multiple input modalities to a shared space. As shown in FIG. 2, the feature representation $F_1$ and the feature representation $F_2$ are input into a machine learning model 230 comprised of a first trajectory encoder 214, a second trajectory encoder 216, a shared embedding space (e.g., an embedded space mapping), namely, a latent space 218, a first trajectory decoder 220 and a second trajectory decoder 224. The latent space 218 is a shared cross-modal latent space trained with features extracted from different modalities. It is understood that the dotted shapes and arrows in FIG. 2 including the first trajectory encoder 214 and the second trajectory encoder 216 are only visible during the training stage of the machine learning model 230. Further, it is understood that although two trajectory decoders and two trajectory encoders are shown in FIG. 2, one or more trajectory decoders and one or more trajectory encoders can be implemented herein.

In the embodiment shown in FIG. 2, the machine learning model 230 is structured according to a Conditional Variational Autoencoder (CVAE). Typically, the CAVE framework maximizes the variational lower bound on a log-likelihood, which may be expressed mathematically as:

$$\log P(y|F) = -KL(Q(z|y,F) \| P(z|F)) + \mathbb{E}_{Q(z|y,f)} \log P(y|z, F)) \quad (8)$$

where Q(z|y, F) and P(y|z, F) respectively denote an encoder and a decoder, F is a condition, and z is a latent variable. The network parameters of the encoder are learned to minimize the Kullback-Leibler divergence between the prior distribution P(z|F) and its approximation Q(z|y, F). The second term is the log-likelihood of samples, which is considered the reconstruction loss of the decoder.

In the methods and systems described herein, equation (8) is reformulated to embed multiple input modalities in the shared latent space 218. Assuming that different data types {I,X}i are available (e.g., i∈ {LiDAR,RGB}), the proposed method predicts future trajectory $y_i$ 232 of the vehicle 102 with the same modalities i. Additionally, during training, the first trajectory encoder 214 and the second trajectory encoder 216 learn to embed feature representations $F_{LiDAR}$ and $F_{RGB}$ as close as possible in the shared latent space 218. The first trajectory decoder 220 and the second trajectory decoder 224 generate trajectories using the same latent variable z sampled from the prior distribution that is modeled as Gaussian distribution z~N(0,1). Accordingly, the objective function of the machine learning model 230 is expressed mathematically as:

$$L_E = \Sigma_i (-KL(Q_i(z|y_i,F_i) \| P_i(z|F_i)) + \mathbb{E}_{Q_i(z|y_i,F_i)} \log P_i(y_i|F_i)) \quad (9)$$

where i∈ {LiDAR,RGB} indicates different types of modalities, $Q_i(\bullet)$ and $P_i(\bullet)$ is an encoder-decoder pair of each modality.

Accordingly, in FIG. 4 at block 410, the method 400 includes predicting a first trajectory and a second trajectory. As described above, the first trajectory decoder 220 computes a first trajectory based on the first feature representation and/or the first set of feature representations and a first latent variable z sampled from the shared embedded space (i.e., the latent space 218), which has been trained with different modalities. Said differently, the processor 118 determines a first trajectory by inputting the first feature representation into the first trajectory decoder 220 and sampling the shared latent space 218 with a latent variable z having the same modality as the first modality. In this example, the modality is top-down views derived from LiDAR data. Based on the above, the first trajectory decoder 220 may reconstruct a first output 226.

Similarly, the second trajectory decoder 224 computers a second trajectory based on the second feature representation and/or the second set of feature representations and a second d latent variable sampled from the shared embedded space (i.e., the latent space 218). Said differently, the processor 118 determines a second trajectory by inputting the second feature representation into the second trajectory decoder 224 and sampling the shared latent space 218 with a latent variable z having the same modality as the second modality. In this example, the modality is a sequence of RGB images. Based on the above, the second trajectory decoder 224 may reconstruct a second output 228.

As mentioned herein, in some embodiments, the framework 200 can include multiple feature encoders and a single trajectory decoder. In this example, since only one decoder is used, the decoder requires an additional indicator to determine which type of output to generate. For example, with an indicator of 1, the decoder predicts a trajectory in a camera space, and with an indicator of 2, the same decoder predicts a trajectory in a LiDAR space.

The strong autoregressive power of decoders often ignore the random variable z sampled from the learned latent space 218. Thus, the output is dominantly generated using the conditional input F, still satisfying the minimization of the Kullback-Leibler divergence and maximization of the log-likelihood in equation (8). Such a problem alleviates the multi-modal nature of future prediction where multiple plausible trajectories are generated given the same past motion. Accordingly, an approach is developed to (i) generate diverse responses from the decoders, which enables multi-modal prediction and (ii) not physically weaken the decoders to alleviate its prediction capability while preventing the performance degradation. In this sense, an auxiliary regularize in the loss function will now be described that pushes the decoder to rely on the latent variable z.

During training of the machine learning model 230, we assume that there exist N modes of trajectories for each query. Then, the latent variables z~$Q(z_i|y, f) = N(\mu, \sigma^2)$ are sampled from the normal distribution of the encoders with the mean and variance $\sigma^2$, where i∈ {1, ... ,N}. Thus, the encoders consider the trajectories generated using these latent variables as N modes of predictions. To maximize the physical distance between each pair of modes, their pairwise similarity is evaluated using Gaussian kernel, which may be expressed mathematically as:

$$K(y_i, y_j) = \exp\left(\frac{D(y_i, y_j)}{2\sigma_G^{\frac{2}{}}}\right) \quad (10)$$

where D(•) is a distance measured between trajectories $y_i$ and $y_j$ with i,j∈ {1, ... , N} and $$\sigma_G^{\frac{2}{}}$$

are the hyper-parameters of the kernel function.

The regularizer is found with a pair of maximum similarity $K(y_i, y_j)$, and the machine learning model 230 is trained to minimize the similarity. This technique enforces the machine learning model 230 to (i) actually use N latent variables while predicting output trajectories with multiple modes, and (ii) minimize the similarity between predicted trajectories through the optimization without losing the prediction capability of the decoders. Accordingly, the total objective function is mathematically expressed as:

$$L_{Total} = -L_E + \lambda \Sigma_i K(y_k, y_l) \quad (11)$$

where i∈{LiDAR, RGB} is an indicator of input sensory types and A balances multi-modality and accuracy (e.g., $\Delta=10$ is used). To optimize the first term in equation (11), the trajectory $y_n$ of the mode n that shows the maximum similarity with the ground truth is determined. In this way, the log-likelihood in equation (9) encourages the decoders to generate accurate results.

Referring again to FIG. 4, the method 400 includes at block 412, controlling the motion device. For example, in one embodiment, the processor 118 generates a control instruction (e.g., motion instructions) based on the first trajectory and the second trajectory. In some embodiments, the processor 118 also transmits the control instruction to the vehicle 102 and/or one or more control systems 114 (e.g., an autonomous vehicle system) thereby controlling motion of the vehicle 102 and/or controlling driving of the vehicle 102 based on the driving instructions. This allows for more accurate trajectory forecasting in highly interactive scenarios.

The embodiments discussed herein may also be described and implemented in the context of "computer-readable medium" or "computer storage medium." As used herein, "computer-readable medium" or "computer storage medium refers to a non-transitory medium that stores instructions, algorithms, and/or data configured to perform one or more of the disclosed functions when executed. Computer-readable medium may be non-volatile, volatile, removable, and non-removable, media implemented in any method or technology for storage of information such as computer readable instructions, data structures, modules or other data. Computer-readable medium may include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device may interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for trajectory prediction and motion device control, comprising:
receiving a first set of data about a surrounding environment of a motion device, wherein the first set of data is LiDAR point cloud data representing a past sequence of top-down views and first position data from the motion device;
receiving a second set of data about the surrounding environment of the motion device, wherein the second set of data is image data representing a past sequence of frontal views and second position data from the motion device, wherein the second set of data is a different modality than the first set of data;
extracting features from the first set of data that model motion behavior of the motion device;
extracting features from the second set of data that model motion behavior of the motion device;
inputting the features from the first set of data and the features from the second set of data into a machine learning model with a shared embedded space;
computing a first trajectory based on a first latent variable sampled from the shared embedded space and a second trajectory based on a second latent variable sampled from the shared embedded space, wherein the first latent variable has the same modality as the first set of data and the second latent variable has the same modality as the second set of data; and
controlling the motion device based on the first trajectory and the second trajectory.

2. The computer-implemented method of claim 1, wherein the features from the first set of data and the features from the second set of data are each composed of environmental stimuli, inertial stimuli, and social stimuli.

3. The computer-implemented method of claim 2, wherein the environmental stimuli includes contextual cues of the surrounding environment of the motion device, the inertial stimuli includes motion intent of the motion device, and social stimuli includes interactions between the motion device and other interactive agents in the surrounding environment of the motion device.

4. The computer-implemented method of claim 1, wherein the embedded space mapping includes a single cross-modal latent space.

5. A computer-implemented method for trajectory prediction and motion device control, comprising:
receiving a first set of data captured during a plurality of time steps about a surrounding environment of a motion device, wherein the first set of data is a past sequence of top-down views having a first modality and first position data from the motion device;
receiving a second set of data captured during the plurality of time steps about the surrounding environment of the motion device, wherein the second set of data is a past sequence of frontal views having a second modality and second position data from the motion device, and wherein the first modality and the second modality are different;
generating a first feature representation describing a motion behavior of the motion device with respect to the surrounding environment based on the first set of data;
generating a second feature representation describing the motion behavior of the motion device with respect to the surrounding environment based on the second set of data;
inputting the first feature representation and the second feature representation into a machine learning model including a shared cross-modal latent space embedded with features extracted from different modalities;
determining a first trajectory based on the first feature representation and a first latent variable sampled from the shared cross-modal latent space;

determining a second trajectory based on the second feature representation and a second latent variable sampled from the shared cross-modal latent space;

generating a control instruction based on the first trajectory and the second trajectory; and controlling motion of the motion device based on the control instruction.

6. The computer-implemented method of claim 5, wherein the first feature representation and the second feature representation ae each composed of environmental stimuli, inertial stimuli, and social stimuli.

7. The computer-implemented method of claim 6, wherein the environmental stimuli includes contextual cues of the surrounding environment of the motion device, the inertial stimuli includes motion intent of the motion device, and social stimuli includes interactions between the motion device and interactive agents in the surrounding environment of the motion device.

\* \* \* \* \*